March 3, 1959  J. V. SYRING  2,875,631
MECHANICAL MOVEMENT DEVICE
Filed Dec. 16, 1957  2 Sheets-Sheet 1

INVENTOR.
Jean V. Syring
BY
W. S. Pettigrew
ATTORNEY

March 3, 1959 J. V. SYRING 2,875,631
MECHANICAL MOVEMENT DEVICE
Filed Dec. 16, 1957 2 Sheets-Sheet 2
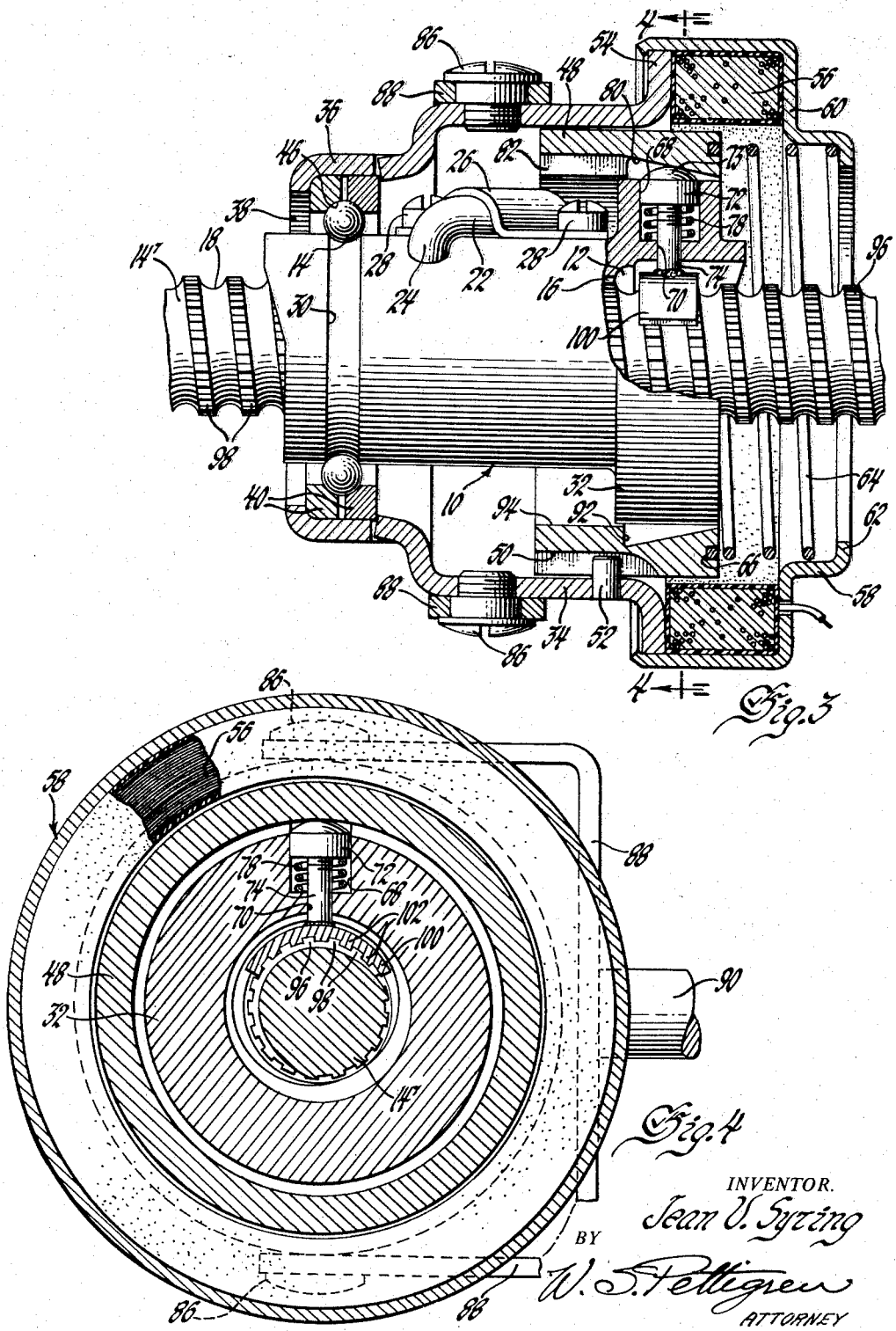
INVENTOR.
Jean V. Syring
BY
W. S. Pettigrew
ATTORNEY

United States Patent Office 2,875,631
Patented Mar. 3, 1959

2,875,631

MECHANICAL MOVEMENT DEVICE

Jean V. Syring, Bay City, Mich., assignor to General Motors Corporation, Detroit, Mich., a corporation of Delaware Application December 16, 1957, Serial No. 703,116

8 Claims. (Cl. 74—424.8)

This invention relates to mechanical movement devices and more particularly to screw and nut actuators.

The screw and nut actuator of this invention is of the general type including a helically threaded lead screw and a recirculating ball type nut threadedly receiving the lead screw. The nut rotatably supports a housing assembly which is adapted to be secured to a member to be operated so that the housing assembly is non-rotatable. The nut may be selectively and alternately braked to the lead screw or to the housing assembly to selectively and alternately secure the nut and lead screw together for simultaneous rotational movement or to secure the nut to the housing assembly for axial movement of the nut and housing assembly along the lead screw upon rotation thereof.

In one preferred embodiment of this invention, the nut mounts a braking member having a brake shoe adapted to frictionally engage the lead screw intermediate the crest of the thread thereof, with the braking member being spring biased out of engagement with the lead screw. The non-rotatable housing which is rotatably supported by the nut fixedly mounts an annular solenoid coil. An annular solenoid armature is slidably mounted on the housing for axial movement relative to the nut and lead screw and includes a cam ramp which is engageable with the braking member under spring force to normally hold the braking member in engagement with the lead screw whereby the nut and lead screw are braked together for simultaneous rotation.

The solenoid armature further includes an axial slot opening to the cam ramp, and when the braking member is aligned with the slot and the solenoid coil is energized to axially move the solenoid armature, the braking member fits within the axial slot to thereby brake the nut to the housing for axial movement therewith along the lead screw upon rotation thereof.

In another preferred embodiment of this invention the crest of the thread of the lead screw is provided with axially aligned teeth and the brake shoe of the braking member is also provided with axially aligned teeth which intermesh with the teeth of the lead screw when the nut and lead screw are normally braked together for simultaneous rotational movement.

An object of this invention is to provide an improved screw and nut actuator of the type including a helically threaded lead screw and a recirculating ball type nut. Another object of this invention is to provide an improved screw and nut actuator of the type including a helically threaded lead screw and a recirculating ball type nut which rotatably supports a housing assembly wherein the nut may be selectively and alternately braked to the lead screw for simultaneous rotational movement therewith or may be braked to the housing assembly for axial movement of the nut and housing assembly along the lead screw upon rotational movement thereof. A further object of this invention is to provide an improved actuator including a lead screw and a recirculating ball type nut having a braking member and rotatably supporting a non-rotatable housing wherein the housing mounts an axially movable non-rotatable solenoid armature which is selectively operable to either hold the brake member in frictional engagement with the lead screw whereby the nut and lead screw rotate together or to secure the braking member to the armature to brake the nut to the housing for axial movement of the housing and nut along the lead screw upon relative rotational movement therebetween. These and other objects of this invention will be readily apparent from the following specification and drawings, wherein:

Figure 3 is a partial axial sectional view of a screw and nut actuator according to another embodiment of this invention; and Figure 4 is a sectional view taken along the plane indicated by line 4—4 of Figure 3.

Figure 1:
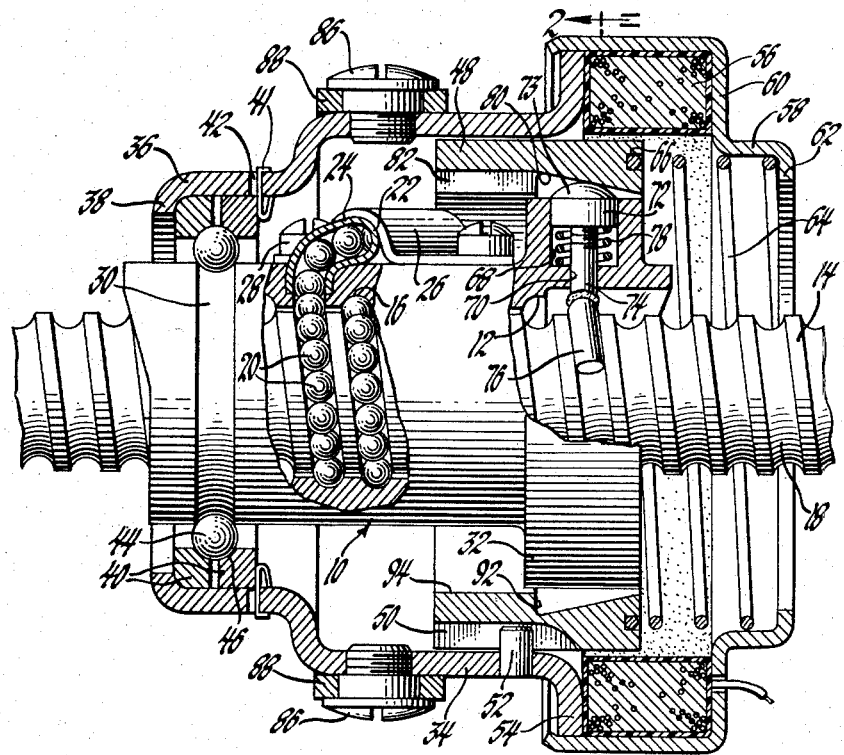
Figure 1 is a partial axial sectional view of a screw and nut actuator according to one embodiment of this invention with parts thereof broken away.

Referring now to Figure 1 of the drawings, an annular nut 10 includes a helically threaded bore 12 which receives a helically threaded lead screw 14. The helical groove 16 of bore 12 and the helical groove 18 of the lead screw are of the same pitch and define a helical passage. A plurality of ball bearings 20 fit within this helical passage and ride in the helical grooves of the nut and lead screw, with opposite ends of the helical passage being interconnected by a transfer tube 22, the ends 24 of which extend tangentially to the helical passage. A bracket 26 bolted to the nut at 28 secures the tube 22 in place. This arrangement of a recirculating ball type nut and lead screw operates in a manner whereby the ball recirculate through the helical passage and the transfer tube 22 whenever the nut and lead screw rotate relative to each other, but do not recirculate whenever the nut and lead screw rotate with each other.

Nut 10 further includes an outer circumferential groove 30 adjacent one end thereof and a laterally extending rather thick annular flange 32 adjacent the other end thereof. A circular sheet metal housing 34 surrounds nut 10 and includes a circular portion 36 of reduced diameter which is provided with a laterally inwardly extending flange 38. The outer race 40 of a thrust bearing fits within the annular portion 36 in engagement with flange 38 and is fixedly secured in place by a number of toothed spring clips 41 which extend inwardly of housing 34 through a plurality of circumferentially spaced slots 42 therein. A plurality of ball bearings 44 fit within the groove 30 of the nut and the groove 46 of race 40 to rotatably support one end of the housing 34 on the nut 10.

A solenoid armature 48 in the form of an annular ring surrounds the flange 32 of nut 10 and is provided with an axially extending slot 50. A pin 52 secured to housing 34 is slidably received within slot 50 whereby the solenoid armature 48 can move axially of housing 34 but cannot rotate relative thereto. The housing 34 is provided with a laterally outwardly extending annular flange 54 which is secured to one side of a circular solenoid coil 56. A cap 58 includes a laterally outwardly extending annular flange 60 secured to the other side of the solenoid coil and a laterally inwardly extending annular flange 62. A coil compression spring 64 seats on flange 62 and within a groove 66 of armature 48 to bias the armature 48 to the left as viewed in Figure 1.

Figure 2:
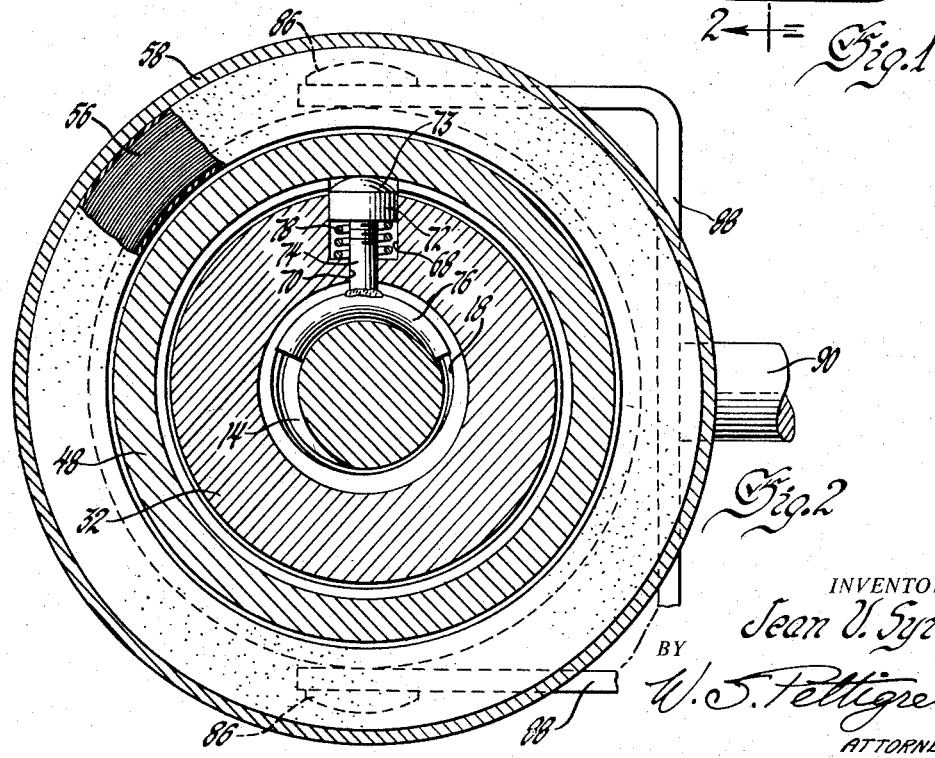
Figure 2 is a sectional view taken along the plane indicated by line 2—2 of Figure 1.

The flange 32 of the nut 10 is provided with an outwardly opening circular bore 68 which is connected to the bore 12 of the nut by a circular bore 70 of smaller diameter. A stud 72 includes a head 73 slidably mounted in bore 68 and a shank 74 slidably mounted in bore 70. The shank 74 is secured to a brake shoe member 76 which is generally circular in shape, as can be seen in Figure 2, and is also generally circular in cross section, as can be seen in Figure 1, so that the brake shoe member is complementary to the helical groove 18 of the lead screw 14. It will further be noted that the brake shoe is located so that it corresponds to the pitch of the helical groove 18. A coil compression spring 78 seats on the shoulder between bores 68 and 70 and engages the head 73 of stud 72 to bias the stud outwardly of the bore 68 to thereby bias the brake shoe member 76 out of engagement with the helical groove 18 of the lead screw 14.

The circular solenoid armature 48 has a portion of its inner surface tapered at 80 in the form of an annular cam ramp. This tapered surface 80 opens at one place to an axially extending slot 82 which has a width generally corresponding to the diameter of the head 73 of the stud 72.

Housing 34 may be bolted at 86 to the arms 88 of a yoke member 90 which may be secured in a suitable manner to a member to be operated, not shown. This yoke member is shown only for purposes of illustration to indicate the manner in which the housing 34 may be secured to a member to be operated whereby the housing is held against rotation but is not held against axial movement relative to the lead screw 14.

The operation of the screw and nut actuator will now be described, and it will be assumed that a motor is operatively connected to the lead screw 14 so as to rotate the lead screw in either direction. In the normal position of the solenoid armature and stud 72, the compression spring 64 biases the solenoid armature to the left whereby the annular tapered surface 80 or cam ramp of the solenoid armature engages the head 73 of stud 72 to force the stud inwardly of the bore 68 against the action of spring 78 and hold the brake shoe member 76 in tight frictional engagement with the helical groove 18 of the lead screw to brake the nut and lead screw together for simultaneous rotational movement. If the lead screw 14 is now rotated, the nut 10 will rotate with the lead screw and during this movement the head 73 of stud 72 will ride on the tapered surface 80 or cam ramp of the solenoid armature 48 as the nut rotates with the lead screw. It will be noted that the head 73 has its upper portion of generally spherical shape to thereby reduce the area of contact between the head of the stud and the tapered surface 80, and also to aid the tapered surface 80 in camming the head of the stud inwardly within bore 68. If the nut and lead screw rotate with each other, the ball bearings 22 do not recirculate within the helical passage defined by the helical grooves 16 and 18 of the nut and lead screw, respectively, or within the transfer tube 22.

Assuming now that the solenoid coil 56 is energized to shift the solenoid armature 48 to the right against the action of the compression spring 64. When the solenoid armature shifts to the right, the tapered surface 80 slides relative to the head 73 of stud 72 to allow spring 78 to bias the stud outwardly of bore 68. If the head of the stud is aligned with the slot 82, the head of the stud will move within this slot to thereby move the brake shoe member 76 out of frictional engagement with the helical groove 18 of the lead screw and to brake the nut with respect to housing 34 since the solenoid armature 48 is secured against rotation relative to the housing by means of the pin 52 and the slot 50. Thereafter, as the lead screw 14 is rotated, the nut 10 and housing 34 will move axially along the lead screw, with the direction of axial movement being controlled by the direction of rotation of the lead screw. During this movement of the nut and housing 34 along the lead screw, the ball bearings 22 will recirculate within the helical passage defined by the helical groove 16 of nut 10 and the helical groove 18 of the lead screw and also through the transfer tube 22.

It will be understood, of course, that the nut and housing 34 cannot be braked together unless the head of the stud 73 is aligned with the slot 82 of armature 48. If the nut 10 and lead screw 14 are rotating together and the solenoid 56 is energized, the solenoid armature 48 will be shifted to the right, as previously described. However, if the head 73 of stud 72 is not aligned with slot 82 when the solenoid coil is energized, the head will engage the annular shoulder 92 between the cam surface 80 and the bore 94 of the armature 48. However, as soon as head 73 moves into alignment with slot 82, the nut will be immediately braked to the solenoid armature, as previously described, to brake the nut to housing 34 and release the brake shoe member 76 from frictional engagement with the helical groove 18 whereby the nut and housing 34 will move axially along the lead screw, as previously described.

If the nut 10 and the housing 34 are braked together, as previously described, and are moving axially along the lead screw 14 when the solenoid armature 56 is deenergized, spring 64 will immediately shift the solenoid armature 48 to the left to immediately move the head 73 of stud 72 out of slot 82 of the armature and within bore 68 to move the brake shoe member 76 into frictional engagement with the helical groove 18 of the lead screw to thereby immediately brake the nut to the lead screw for rotation therewith relative to the housing 34 which will then remain stationary.

Referring now particularly to Figures 3 and 4 of the drawings, another embodiment of this invention will be described and like numerals will be used for like parts.

The crest 96 of the thread of the lead screw 14' is provided with a number of axially extending teeth 98, with each of the axially spaced teeth being axially aligned. A brake shoe member 100 which is arcuate in shape is secured to the shank 74 of stud 72 and is provided with a number of teeth 102 which extend axially relative to the axis of the lead screw 14. Whenever the nut and lead screw 14 are braked together, as previously described, the teeth 102 intermesh with the teeth 98 on the crest of the thread of the lead screw to thereby positively brake the nut to the lead screw. Other than this modification, the screw and nut actuator shown in Figures 3 and 4 of the drawings is the same as that shown in Figures 1 and 2 and operates in the same manner.

Thus, this invention provides a new and improved screw and nut actuator which includes a helically threaded lead screw and a recirculating ball type nut which includes a braking member adapted to selectively engage the lead screw to brake the nut to the lead screw for simultaneous rotational movement therewith or to brake the nut to a non-rotatable housing for axial movement of the nut and housing along the lead screw. The solenoid armature which controls the braking action of the brake member and is selectively controlled by the solenoid coil provides the connecting means between the braking member and the non-rotatable housing. Thus, the screw and nut actuator includes a minimum number of parts and yet adequately operates in a smooth and quiet manner.

I claim:

1. A mechanical movement device comprising, first and second rotatable members, means interconnecting said members for axial movement of one of said members relative to the other of said members upon relative rotational movement therebetween, locking means on one of said members normally engageable with the other of said members whereby said members are secured together for simultaneous rotational movement, a non-rotatable member, a non-rotatable actuating member supported by said non-rotatable member for axial movement relative to the axis of rotation of said first and second rotatable members and normally holding said locking means in engagement with said other of said members, and means for selectively operating said actuating member to release said locking means from engagement with said other of said members.

2. A mechanical movement device comprising, first and second rotatable members, means interconnecting said members for axial movement of one of said members relative to the other of said members upon relative rotational movement therebetween, locking means on one of said members normally engageable with the other of said members whereby said members are secured together for simultaneous rotational movement, a non-rotatable member, an actuating and connecting member slidably and non-rotatably supported by said non-rotatable member for selectively and alternatively holding said locking means in engagement with said other of said members or connecting said means to said non-rotatable member, and means for selectively operating said actuating and connecting member.

3. A mechanical movement device comprising, first and second rotatable members, means interconnecting said members for axial movement of one of said members relative to the other of said members upon relative rotational movement therebetween, radially movable locking means on one of said members normally engageable with the other of said members whereby said members are secured together for simultaneous rotational movement, a non-rotatable housing, an actuating and connecting member slidably and non-rotatably supported on said housing for axial movement between actuating and connecting positions, means normally holding said actuating and connecting member in said actuating position thereof to hold said locking means in engagement with said other of said members, and means for selectively moving said actuating and connecting member to said connecting position thereof to release said locking means from engagement with said other of said members and connect locking means to said housing.

4. A mechanical movement device comprising, first and second rotatable members, means interconnecting said members for axial movement of one of said members relative to the other of said members upon relative rotational movement therebetween, a non-rotatable housing, a locking member on one of said rotatable members for selectively and alternately securing said one rotatable member to the other of said members or to said non-rotatable member, an actuating and connecting member slidably and non-rotatably supported on said housing for axial movement between actuating and connecting positions, resilient means normally holding said actuating and connecting member in said actuating position thereof to slidably engage said locking member and hold said locking member in engagement with said other of said rotatable members whereby said rotatable members rotate together relative to said housing and actuating and connecting member, and power operated means for selectively moving said actuating and connecting member to said connecting position thereof to connect said locking member thereto and release said locking member from engagement with said other of said rotatable members whereby said one of said rotatable members moves axially of said other of said rotatable members.

5. A mechanical movement device comprising, nut and lead screw members, means threadedly interconnecting said members for axial movement of said nut member relative to said lead screw member upon relative rotational movement therebetween, a radially movable locking member on said nut member, a non-rotatable housing, an annular actuating and connecting member surrounding said nut and locking members and being slidably and non-rotatably supported on said housing for axial movement between actuating and connecting positions, means normally holding said annular member in said actuating position thereof wherein said annular member slidably engages said locking member to hold said locking member in engagement with said lead screw member whereby said nut and lead screw members rotate together relative to said annular member and housing, and means for selectively moving said annular member to said connecting position thereof to connect said locking member thereto and release said locking member from engagement with said lead screw whereby said nut member moves axially of said lead screw member.

6. A mechanical movement device comprising, nut and lead screw members, means threadedly interconnecting said members for axial movement of said nut member relative to said lead screw member upon relative rotational movement therebetween, a radially movable locking member supported on said nut, a non-rotatable housing, an annular actuating and connecting member surrounding said nut and locking members and being slidably and non-rotatably supported on said housing for axial movement between actuating and connecting positions, said annular member including an annular cam surface and an axial slot opening thereto, means normally holding said annular member in said actuating position thereof wherein said annular cam surface slidably engages said locking member to hold said locking member in engagement with said lead screw member, and means for selectively moving said annular member to said connecting position thereof wherein said locking member is received within said axial slot to connect said locking member thereto and release said locking member from engagement with said lead screw member.

7. A mechanical movement device comprising, nut and lead screw members, recirculating ball means threadedly interconnecting said members for axial movement of said nut member relative to said lead screw member upon relative rotational movement therebetween, radially movable locking means on said nut member normally engageable with said lead screw member whereby said members are secured together for simultaneous rotational movement, a non-rotatable housing, an actuating and connecting member slidably and non-rotatably supported on said housing for axial movement between actuating and connecting positions, means normally holding said actuating and connecting member in said actuating position thereof to hold said locking means in engagement with said lead screw member, and means for selectively moving said actuating and connecting member to said connecting position thereof to release said locking means from engagement with said lead screw member and connect said locking means to said housing.

8. A mechanical movement device comprising a threaded lead screw member having a toothed crest, a nut member threadedly receiving said lead screw member for axial movement thereof relative to said lead screw member upon relative rotational movement therebetween, a radially movable locking member mounted on said nut member and including a toothed clutch member, a non-rotatable housing, an annular actuating and connecting member surrounding said nut and locking members and being slidably and non-rotatably supported on said housing for axial movement between actuating and connecting positions, means normally holding said actuating and connecting member in said actuating position thereof wherein said member slidably engages said locking member to hold said toothed clutch member thereof in engagement with the toothed crest of said lead screw member whereby said nut and lead screw members rotate together relative to said annular member and housing, and means for selectively moving said annular member to said connecting position thereof to connect said locking member thereto and release said clutch member from engagement with said lead screw whereby said nut member moves axially of said lead screw member.

References Cited in the file of this patent

UNITED STATES PATENTS

| | | |
|---|---|---|
| 1,276,811 | Ragan | Aug. 27, 1918 |
| 2,504,018 | Gibson et al. | Apr. 11, 1950 |
| 2,701,478 | Riess | Feb. 8, 1955 |
| 2,716,352 | Wilson | Aug. 30, 1955 |